March 3, 1931.  A. SCHWARZENZER  1,794,486
PISTON RING
Filed April 23, 1928
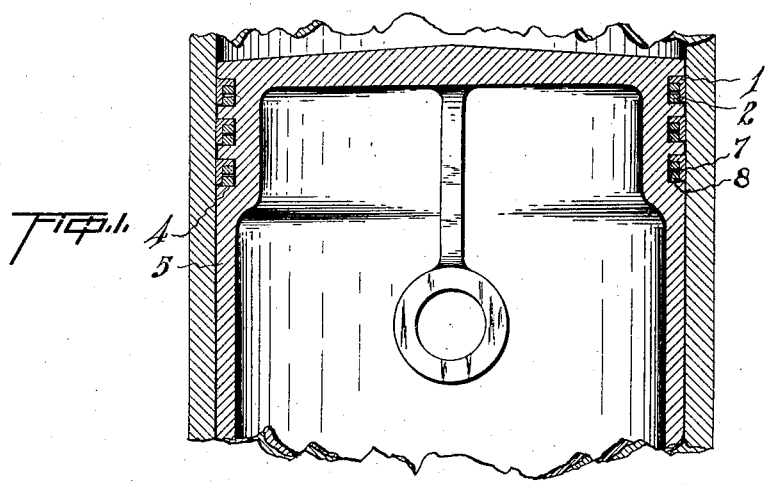
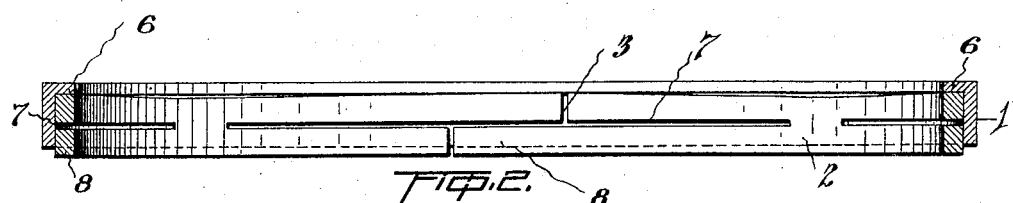
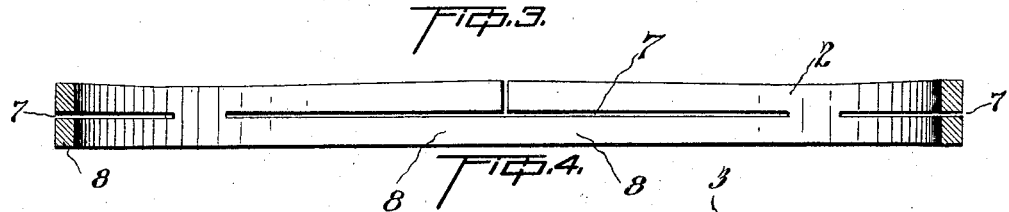
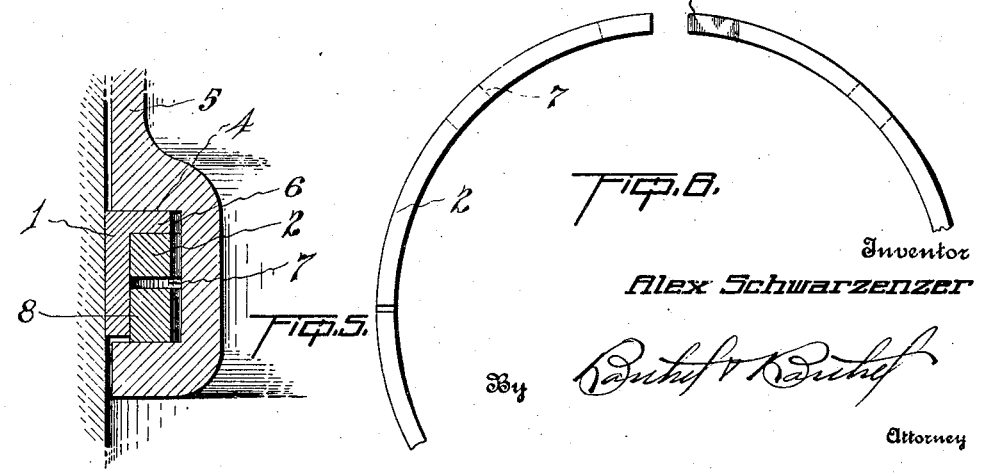
Inventor
Alex Schwarzenzer
By
Attorney Patented Mar. 3, 1931

1,794,486

UNITED STATES PATENT OFFICE

ALEX SCHWARZENZER, OF ERIN TOWNSHIP, MACOMB COUNTY, MICHIGAN, ASSIGNOR, BY DIRECT AND MESNE ASSIGNMENTS, TO ALEXANDER H. HILLER AND MAMIE HILLER, BOTH OF DETROIT, MICHIGAN

PISTON RING

Application filed April 23, 1928. Serial No. 272,213.

This invention relates to a piston packing ring and more particularly to a ring which is especially adapted for use upon the pistons of internal combustion engines. An object of the invention is to provide a ring which will prevent leakage past the ring and which ring will have an expansive force sufficient to hold it in firm even contact with the cylinder wall but will not exert so great an expansive force as to cause undue friction and retard the operation of the piston. A further object is to provide a ring which has not only a radial expansion but also a lateral expansion operative to hold the ring in contact with a lateral wall of the groove in which it is mounted and prevent leakage past the ring into the groove behind the ring and thence out at the lower side of the ring. It is also an object to provide a two-part ring in which one of the parts provides radial expansion and the other part lateral expansion, said parts cooperating within the groove in a piston to yieldingly hold the ring in contact with the cylinder wall and with a lateral wall of the groove in which the ring is mounted Simplification of construction and cheapness of manufacture are also objects of the invention and further objects will more fully appear from the description and operation as hereinafter set forth.

With the above and other ends in view the invention consists in the matters hereinafter set forth and more particularly pointed out in the appended claim, reference being had to the drawing in which Figure 1 is a transverse vertical section through a portion of a cylinder and a piston therein, with rings illustrative of the present invention in place on the piston and in section;

Fig. 2 is a sectional detail of an assembled ring;

Fig. 3 is a similar section of an outer ring member;

Fig. 4 is a section of an inner ring member;

Fig. 5 is an enlarged sectional detail showing the ring in section and within a groove in a piston within a cylinder, and Fig. 6 is an edge elevation of the upper side edge of a portion of the inner ring member.

The present ring comprises an outer ring member 1 and an inner ring member 2 within the outer member, both members being split or divided transversely with a stepped split 3 in the usual manner of making split expansible rings. The outer member has an outer smooth surface of a width substantially equal to but slightly less than the width of the groove 4 in the piston wall 5 within which the ring is to operate, and said outer member is also formed with a flange 6 projecting inwardly with its upper side flush with the upper edge of the member, to engage over the upper edge of the inner ring member 2, said flange projecting inwardly to the full thickness of the inner member.

The inner ring member 2 is slitted or divided longitudinally at intervals by sawing through the member centrally of its width as at 7 and then dividing the partially separated portions above the slits and intermediate the ends of each slit, thus forming a pair of spring fingers 8 at the upper side of each slit.

The combined width of the blank from which the inner ring member is formed and the thickness of the flange 6 on the outer ring member beneath which the inner ring member is adapted to seat, is slightly greater than the width of the groove in which the members are to be placed. To reduce this over-all width so that the combined members will fit snugly within the groove, the free ends of the spring fingers are pressed laterally of the ring members until these ends contact the lower sides of the slits 7 and are held in this position while the upper edge of the ring member is turned off, reducing the width of the ring member sufficiently to permit the members to be freely inserted in the groove of the piston when the inner member is in place within the outer member. When these spring fingers are released they will spring laterally to their normal position or for a distance equal to the width of the slit or cut which separates them from the lower portion of the member and therefore in order to enter the assembled members in the groove of the piston, it is necessary to compress the free ends of these fingers, and when the assembled ring is in the groove these spring fingers provide a lateral spring tension for the ring within the groove, the free ends of the finger yieldingly engaging the lower side of the flange 6 and thus forcing the inner ring member downwardly with its lower straight edge against the lower side wall of the groove and the outer ring member is thereby in turn held yieldingly against the upper side wall of the groove. The assembled ring therefore has a lateral or side expansion which holds it against movement longitudinally of the piston within its groove and thus prevents the products of combustion or fuel from passing the upper side edge of the ring and entering the groove back of the ring where it would find its way out at the bottom edge of the ring and thus cause a leak past the ring which would result in loss of compression and dilution of the oil contained in the engine crank case.

In this construction the outer ring member provides an outer smooth surface for the ring to engage the cylinder wall and as this outer member is a split ring it exerts an expansible force against said wall, such expansive force and the strength of the ring member being increased by the inwardly extending flange thereon. The inner ring member is also a split ring and therefore exerts an expansive force against the outer ring member, assisting in holding the outer ring member in forming even contact with the cylinder wall. Because of this tendency of the inner ring member to expand, its spring fingers are held thereby in contact with the inner surface of the outer ring member and are therefore protected against becoming broken in operation and also against vibration or flexure during the operation of the piston in the cylinder. The spring fingers of the inner member not only serve to hold the outer member firmly against the upper side wall of the groove at all times but also afford a lateral spring tension preventing movement of the inner ring within the groove and holding its lower straight edge yieldingly and firmly against the lower side wall of the groove, further insuring against leakage past the ring.

When the inner and outer ring members are assembled their stepped splits or cuts 3 are positioned diametrically opposite each other and therefore the openings formed thereby are closed and the path for the passage of fluid past the ring provided by such openings is blocked.

Preferably one of the slits or cuts 7 will extend across the split 3 of the inner ring member as shown in Fig. 2 and the other slits will be spaced apart around the entire circumference of the member, any suitable number of these slits being provided in order to form the desired number of spring fingers. In the manufacture of this ring, the members are so proportioned as to give the ring just the desired expansive force against the cylinder wall and this is possibly due to the combining of the members which are both split rings. The ring will therefore contact the cylinder wall with an even pressure at all points and this pressure need not be excessive as the outer member provides a smooth contact surface. Both members of the ring are of even thickness throughout their entire circumference, such construction being permissible due to the combining of the two members with their split ends arranged diametrically opposite each other, and therefore manufacture of the ring is facilitated and each may be formed perfectly true and round to accurately fit the bore of the cylinder.

Obviously the lateral expansion or yield of the inner member in the direction of its width, may be secured by employing a construction other than forming said member with spring fingers, the adjacent ends of which are separated and which fingers are connected with the ring member at one end only. Other changes, falling within the scope of the appended claim are contemplated and I do not therefore limit myself to the particular construction and arrangement shown.

What I claim is:—

A piston ring including an outer expansible cast metal ring member and an inner expansible cast metal ring member, said outer member being formed with an inwardly extending portion and said inner member being provided with fingers along one edge yieldable laterally of the ring to yieldingly hold said inner member against a side of a groove in which the ring is mounted and the outer member against the opposite side of said groove.

In testimony whereof I affix my signature.

ALEX SCHWARZENZER.